United States Patent
Sorenson, III et al.

(10) Patent No.: US 11,748,260 B1
(45) Date of Patent: Sep. 5, 2023

(54) SERVICE PERFORMANCE ENHANCEMENT USING ADVANCE NOTIFICATIONS OF REDUCED-CAPACITY PHASES OF OPERATIONS

(71) Applicant: Amazon Technologies, Inc., Seattle, WA (US)

(72) Inventors: James Christopher Sorenson, III, Seattle, WA (US); Yishai Galatzer, Redmond, WA (US); Bernd Joachim Wolfgang Mathiske, Shoreline, WA (US); Steven Collison, Seattle, WA (US); Paul Henry Hohensee, Nashua, NH (US)

(73) Assignee: Amazon Technologies, Inc., Seattle, WA (US)

( * ) Notice: Subject to any disclaimer, the term of this patent is extended or adjusted under 35 U.S.C. 154(b) by 811 days.

(21) Appl. No.: 16/579,714

(22) Filed: Sep. 23, 2019

(51) Int. Cl.
*G06F 12/02* (2006.01)
*G06F 9/455* (2018.01)
*H04L 67/00* (2022.01)
*G06F 11/36* (2006.01)
*H04L 67/51* (2022.01)

(52) U.S. Cl.
CPC ...... *G06F 12/0276* (2013.01); *G06F 9/45504* (2013.01); *G06F 11/3612* (2013.01); *H04L 67/34* (2013.01); *H04L 67/51* (2022.05)

(58) Field of Classification Search
CPC ............ G06F 12/0276; G06F 9/45504; G06F 11/3612; H04L 67/16; H04L 67/34
See application file for complete search history.

(56) References Cited

U.S. PATENT DOCUMENTS

| | | | |
|---|---|---|---|
| 6,237,060 B1* | 5/2001 | Shilts | G06F 12/0253 711/135 |
| 6,457,142 B1* | 9/2002 | Klemm | G06F 11/3476 714/38.12 |
| 7,475,214 B2 | 1/2009 | Hwang | |
| 8,458,702 B1* | 6/2013 | Wu | G06F 9/45504 718/1 |
| 8,529,566 B2 | 9/2013 | Kappus et al. | |
| 8,583,783 B1* | 11/2013 | Hayward | G06F 12/0253 709/224 |
| 9,146,756 B2 | 9/2015 | McArdle | |
| 10,051,043 B2 | 8/2018 | Kasso et al. | |
| 10,176,886 B1* | 1/2019 | Spencer | G06F 11/1012 |

(Continued)

OTHER PUBLICATIONS

Degenbaev, "Idle Time Garbage Collection Scheduling", pp. 1-14. (Year: 2016).*

(Continued)

*Primary Examiner* — S. Sough
*Assistant Examiner* — Phuong N Hoang
(74) *Attorney, Agent, or Firm* — Robert C. Kowert; Kowert, Hood, Munyon, Rankin & Goetzel, P.C.

(57) ABSTRACT

A first run-time environment executing a first instance of an application, and a second run-time environment executing a second instance of the application are established. An indication of an impending commencement of a reduced-capacity phase of operation of the first run-time environment is obtained at a service request receiver. Based at least in part on the indication, the service request receiver directs a service request to the second instance of the application.

20 Claims, 11 Drawing Sheets

(56) References Cited

U.S. PATENT DOCUMENTS

| | | | |
|---|---|---|---|
| 10,205,640 B2 | 2/2019 | Chan et al. | |
| 2007/0260654 A1* | 11/2007 | Creamer | H04L 67/1008 |
| 2007/0276630 A1 | 11/2007 | Cheng et al. | |
| 2012/0036309 A1* | 2/2012 | Dillow | G06F 12/0253 |
| | | | 711/E12.008 |
| 2016/0342443 A1* | 11/2016 | McDermott | G06F 9/5016 |
| 2016/0350214 A1* | 12/2016 | Payer | G06F 16/289 |
| 2017/0031814 A1* | 2/2017 | Frazier | G06F 3/0608 |
| 2017/0116115 A1* | 4/2017 | Carter | G06F 12/0253 |
| 2020/0327052 A1* | 10/2020 | Nilsen | G06F 12/0269 |

OTHER PUBLICATIONS

Amazon DynamoDB, "Developer Guide", dated 2019, pp. 1-1055.
Wikipedia, "Java Management Extensions", Retrieved from https://en.wikipedia.org/wiki/Java_Management_Extensions, dated Jun. 27, 2019, pp. 1-5.
Java, "Launches a Java Application", Retrieved from https://docs.oracle.com/javase/7/docs/technotes/tools/windows/java.html, pp. 1-13.
Java, "Monitoring Tools", Retrieved from https://docs.oracle.com/javase/8/docs/technotes/guides/troubleshoot/tooldescr025.html, pp. 1-2.

* cited by examiner

SERVICE PERFORMANCE ENHANCEMENT USING ADVANCE NOTIFICATIONS OF REDUCED-CAPACITY PHASES OF OPERATIONS

BACKGROUND

Many modern computer applications and services are implemented using the infrastructure of provider networks or cloud computing environments. Some of these services may offer their clients service level agreements (SLAs) with fairly strict objectives with respect to request response times, throughputs, service availability, data durability and the like. The operators of the services are responsible for configuring an appropriate collection of resources to ensure that the requirements and targeted objectives of such SLAs can be satisfied. In some cases, at least a subset of the resources of such services may be configured in multi-tenant mode, so that a single physical or virtualized resource can potentially be used to respond to requests from numerous clients. The service request workloads levels of individual clients may vary over time, and may also differ substantially from those of other clients, further complicating the resource provisioning and allocation problem faced by the service providers.

Components of many network-accessible services are written using languages such as Java™, which offer many attractive features such as cross-platform portability, extensive libraries for performing various kinds of computations, support for sophisticated object oriented programming, and the like. Various types of dynamic memory management tasks (e.g., allocation and freeing of heap memory) may be handled automatically in at least some such languages, with a garbage collector responsible for freeing up no-longer-referenced portions of memory when needed.

One of the problems associated with the use of such languages for services with stringent performance and scalability requirements is that garbage collection operations can impact the performance achievable for service requests submitted by clients of the service. For example, in order to free up sections of a heap that were allocated earlier but are no longer reachable, a garbage collector of a JVM (Java' virtual machine) or other similar run-time environment may in effect have to interrupt the work of threads implementing the functionality of the service, thereby increasing response times and reducing throughput during the garbage collection period. While it is possible in principle to reduce the durations of such interruptions or pauses, e.g., by changing configuration settings associated with garbage collection, such tuning exercises are often resource-intensive and rarely eliminate the problem entirely.

Figure 1:
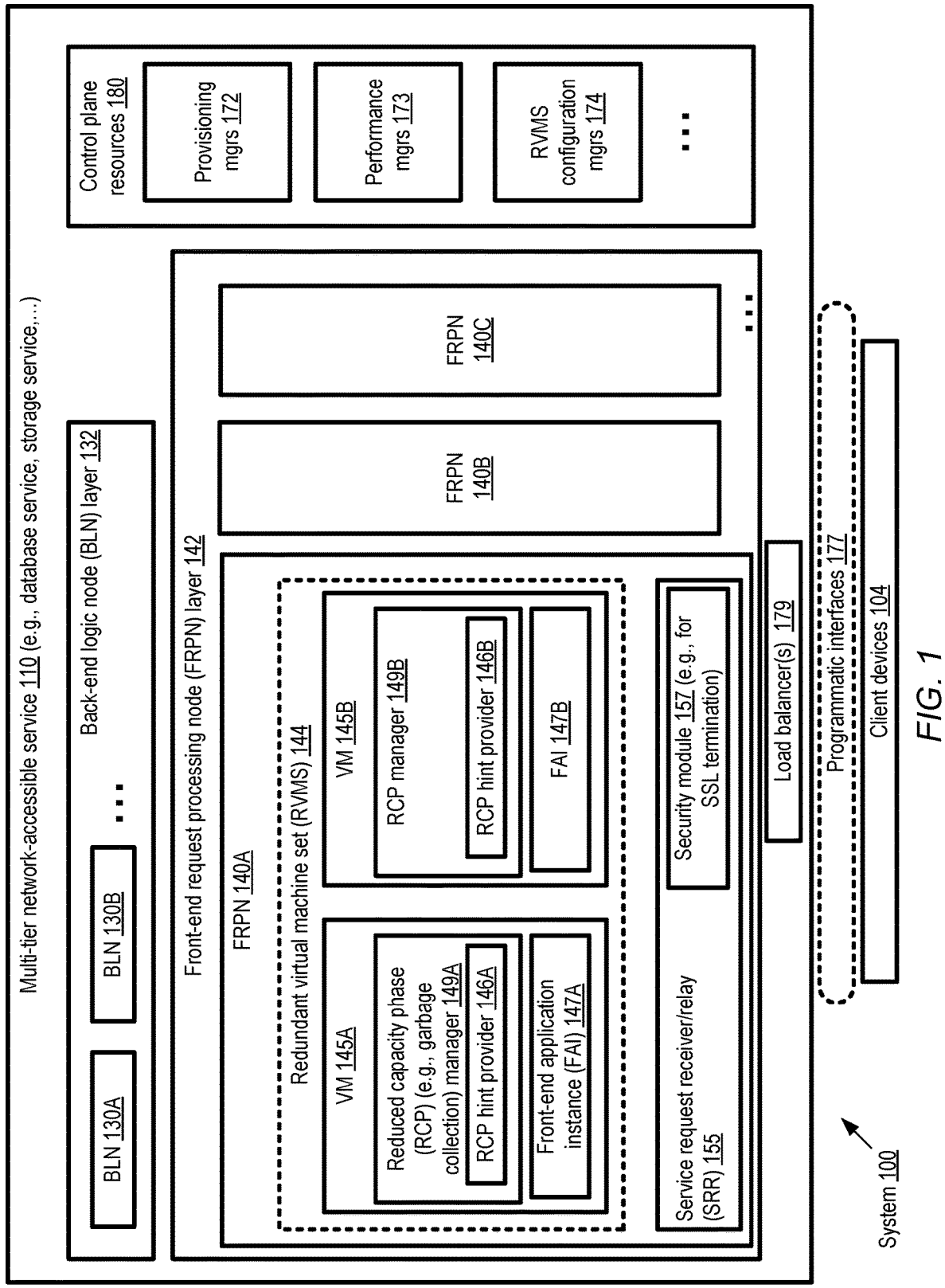
FIG. 1 illustrates an example system environment in which performance obtained for service requests received at a network-accessible service may be enhanced by directing service requests to selected virtual machines based on advance notifications of reduced capacity phases of operations, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for enhancing the performance of network accessible services which employ run-time environments with predictable phases of reduced performance capacity, e.g., by using advance notifications of such phases to avoid processing service requests at any given run-time environment while that environment is in such a reduced capacity phase. In some embodiments, a given run-time environment may for example include a virtual machine (similar to a Java' virtual machine (JVM)) at which an administrative component of the environment automatically schedules garbage collection (GC) operations to free up no-longer-referenced heap memory when needed. During some stages of such a garbage collection, application-related computations may have to be paused at the run-time environment (or may not be performed as quickly as they typically can be when garbage collection is not underway); as such, garbage collections may represent one example of a reduced capacity phase (RCP). Such pauses or slowdowns may be required, for example, because threads implementing the garbage collection algorithm may require the state of the heap to remain unmodified (briefly) by mutator threads (the threads processing service requests), which in turn implies that modification or allocation of objects which the mutator threads need to continue processing service requests has to be deferred.

For at least some network accessible services, the reduction in performance (e.g., increases in response times, decreases in throughput, etc.) with respect to received service requests during such reduced capacity phases may not be acceptable, e.g., in view of the service level agreements in place for service clients. Accordingly, in some embodiments, the following technique may be implemented to overcome the limitations of reduced capacity phases of individual run-time environments. Instead of instantiating a single run-time environment or virtual machine at a host at which an application that performs operations to process service requests is run, at least a pair of such run-time environments may be run. Such a collection of run-time environments may be referred to as a "redundant set" of run-time environments, as individual run-time environments of the collection may in effect be capable of replacing (at least temporarily) other run-time environments of the collection in such a way that the substitution does not affect the service performance perceived by clients of the service. Each of the run-time environments may be used for a respective instance of the request processing application. The run-time environments may be configured in such a way (e.g., using Java' management extensions or JMX in the case of JVMs) that they provide advance notifications of their respective reduced capacity phases (e.g., a few milliseconds in advance of the start of a given reduced capacity phase) to their respective application instances. A reduced capacity phase may be considered to be "impending" based on any of a variety of configurable criteria in different embodiments—e.g., when the reduced capacity phase is expected to start within the next T1 milliseconds in one embodiment, or when only P % of the resources whose exhaustion leads to the initiation of the reduced capacity phase remain free in another embodiment. Upon receiving an advance notification of the impending reduced capacity phase, in various embodiments the application instance may in turn notify an upstream component of the service (which may be termed a service request receiver or SRR) that is responsible for receiving and directing individual service requests (originally submitted by service clients) to the application instances. In at least some embodiments, an SRR may also be responsible for security-related processing with respect to received service requests—e.g., an SRR may terminate an SSL (secure sockets layer) connection and decrypt encrypted versions of service requests, and so on.

When the SRR receives an indication of an impending GC or similar RCP from a given run-time environment RTE1 of a redundant set of RTEs (including for example a "spare" RTE RTE2), this may serve as a signal that the SRR is to stop sending received service requests to RTE1 for some time, and start sending the received service requests to RTE2 (or some other RTE of the redundant set). When a new service request is received at the SRR after such a signal has been received, it may perform any security protocol operations needed (e.g., to extract a decrypted version of the service request from an encrypted set of bytes), and then direct the service request to the application instance at another RTE of the redundant set in various embodiments. Later, based on another triggering condition or notification (e.g., a notification that RTE1's RCP has ended or is about to end), the SRR may switch back to using RTE1 for additional service requests. In some embodiments, the SRR may in effect switch back and forth among two (or more) RTEs over time, making sure to avoid (as far as possible) sending service requests to an RTE that is in a reduced capacity phase. As a result of such transitions, the net effect with respect to the performance achieved for service requests may be very similar to a scenario in which reduced capacity phases do not occur at all (which would of course be very hard to achievable with a single RTE). In at least some embodiments, in which the service request receiver is run at the same host as the collection of RTEs among which the requests are distributed, such performance improvements may be achieved without the overhead associated with re-establishing client connections, re-terminating SSL and the like. As a result of the advance notifications to help direct service requests, extensive parameter tuning (e.g., heap size tuning, garbage collection algorithm selection tuning, etc.) may no longer be needed to optimize performance of the individual RTEs. For services with very stringent performance requirements, the overhead associated with setting up redundant RTEs may be minor, compared to the performance benefits achieved.

As one skilled in the art will appreciate in light of this disclosure, certain embodiments may be capable of achieving various advantages and practical applications/benefits, including some or all of the following: (a) reducing the average response times for requests directed to a variety of network-accessible services such as various types of database services, storage services and the like, (b) increasing the average throughput for such service requests, (c) substantially reducing the variation in response times and throughputs, thereby enhancing the user experience of service clients and (d) reducing the amount of computing, memory and other resources which may otherwise have to be dedicated to exercises to tune the run-time environments used for processing service requests.

According to at least some embodiments, a system may comprise one or more computing devices. The computing devices may include instructions that upon execution on or across one or more processors cause the one or more computing devices to instantiate, at a particular host of a network-accessible service, (a) a service request receiver, (b) a first virtual machine executing a first instance of an application which performs one or more operations to fulfill respective service requests, and (c) a second virtual machine executing a second instance of the application. The first virtual machine may be configured to provide a first indication (e.g., a message) of an impending commencement of a garbage collection (or other reduced capacity phase of operation) of the first virtual machine to the first instance of the application. The service request receiver may be configured to obtain, from the first instance of the application, a second indication of the impending commencement of the garbage collection (e.g., a forwarded or transformed version of the message or notification that was received at the first application instance from the first virtual machine). In some cases, the mechanisms available for communication between the virtual machines and the application instances may differ from the mechanisms available for communication between the application instances and the service request receiver, thus requiring the application instances to transform the notification instead of simply forwarding it.

As part of its normal functionality with respect to received messages containing service requests, the service request receiver may perform one or more operations of a security protocol to extract the contents of a service request from an encrypted set of bytes received via a network connection in various embodiments (e.g., a connection to a front-end load balancer of the service, or to a device of a client of the service). The service request receiver may determine, based on the received indication of the impending garbage collection, that the extracted service request is not to be directed to the first instance of the application. Instead, the service request receiver may direct the service request to the second instance, where it may be processed without the slowdowns/pauses associated with the garbage collection. Note that in at least some embodiments, the second virtual machine or run-time environment may also be subject to slowdowns during its own reduced capacity phases, so the second run-time environment may also notify the second instance of the application in advance of such phases. The second instance of the application may in turn notify the service request receiver, which may cause the service request receiver to switch back to the first instance of the application to avoid sending requests to the second instance of the application during the garbage collection of the second virtual machine. Note that at least in some embodiments, while the virtual machine may communicate directly with the application instance (e.g., a set of byte code) running at the virtual machine, it may not be capable of communicating directly with the service request receiver, which is why the notifications regarding the impending garbage collection may have to be sent via the application instance instead of being sent directly to the service request receiver. In other embodiments, the virtual machine may send such notifications directly to the service request receiver.

Any of several variations of the basic request transitioning scheme described above may be implemented in different embodiments. In one embodiment, when notifying an application instance regarding an impending RCP such as a GC, an RTE such as a virtual machine may also provide an indication of an expected duration of the RCP, in effect informing the application instance of when it would be "safe" from a performance perspective to resume sending requests to the application instance. In such an embodiment, the service request receiver (SRR) may use the expected duration to switch back to the application instance at the RTE which was scheduled to undergo the RCP.

In another embodiment, instead of or in addition to providing an estimate of when the RCP will end, the RTE may send an explicit notification to the application instance when the RTE's RCP is completed. A corresponding notification may be sent on to the SRR by the application instance, and serve as a signal that it is acceptable for the SRR to resume sending service requests to the RTE to which requests were not being sent during the RCP.

In some embodiments, an RTE may capture one or more resource consumption metrics (such as the rate at which heap memory is being allocated) during the periods when the application instance at that RTE is processing service requests, and use the trends observed in such metrics to estimate a time at which the next RCP (such as a GC caused by a lack of sufficient free heap memory) is likely to commence. Such estimated RCP commencement times may then be used to schedule the notification to the application instance in advance of the actual RCP commencements.

According to at least one embodiment, an RTE may set aside one or more "spare" sets of resources (e.g., one or more regions of memory, in a scenario in which a region-based memory management or garbage collection technique is being used) in an attempt to ensure that processing of service requests close to the time of actual commencement of the RCP can be completed at a desired performance level. Such spare resources or resource pools may be utilized in some cases in the time period after the RTE determines that the commencement of reduced-capacity phase of operation is impending. In one embodiment in which RCPs include GCs, and the spare resources include a portion of the heap, a GC of the remaining portion of the heap may be initiated, while the spare portion of the heap is used to complete processing of in-flight requests (requests that have already been received at the application instance running at the RTE, but have not yet been fully processed).

According to at least one embodiment, the RTE may be provided a value of an advance notice interval parameter, indicating by how long a time period the notification of the occurrence of the RCP should precede the actual RCP. For example, in one embodiment, the RTE may be informed that the notice of an impending RCP should be sent to the application instance or the SRR at least T milliseconds before that RCP is to begin. Any of a number of different mechanisms may be used to indicate the parameter, such as a command line flag used during the launch of the RTE, an API (application programming interface) that can be invoked after the RTE is launched, a parameter file, a message transmitted to the RTE via the application instance, and so on. Such an advance period may be used to finish processing an in-progress or currently-queued set of requests at the RTE which is to undergo the RCP, for example, so that the performance achieved for such in-progress requests is not affected by the RCP. In effect, by using the advance notice parameter, in such embodiments the RTE may set aside some fraction of its resources to complete the processing of requests that have already been directed to and/or received at the RTE's application instance before beginning its next RCP. In at least some embodiments, the advance notice parameter may be dynamically modified during the lifetime of an application instance or RTE, e.g., based on measured variations in the arrival rates of requests, corresponding measurements regarding heap memory allocation rates, and so on. In one embodiment, the SRR may transmit the value of the advance notice interval to the RTE, e.g., via the RTE's application instance.

In some embodiments, a symmetrical configuration of the RTEs may be used, e.g., with approximately equal processing capacity, memory and other resources being configured for each of the RTEs configured as a redundant set for a given SRR. In other embodiments, an asymmetric configuration may be used, so that for example RTE1 of the redundant set is configured with a larger heap size (or other resource setting) than RTE2. According to one embodiment, more than two RTEs may be set up for the requests received at a single SRR, and/or additional RTEs may be instantiated dynamically based on metrics gathered from the currently-in-place application instances or RTEs. For example, an SRR may initially be configured to direct requests to a pair of RTEs RTE1 and RTE2, and a third RTE RTE3 may be established based on performance or workload metrics gathered from the initial configuration, and the SRR may start sending some fraction of requests to RTE3 (making sure to avoid RTE3's RCPs just as it avoided sending requests to RTE1 and RTE2 during their respective RCPs).

According to one embodiment, the functionality of transitioning between different application instances may itself be dynamically enabled or disabled. For example, based on analysis of performance metrics, a second RTE may be launched at an environment in which an SRR was initially configured with just one RTE. The SRR may then start directing service requests to a particular RTE of the pair selected based on advance notifications of RCPs as discussed above. Similarly, one or more RTEs of a redundant set may be terminated in some embodiments, leaving just one RTE to handle all service requests, based on collected metrics which indicate that the benefit of switching requests between RTEs no longer outweigh the costs of doing so.

In at least some embodiments, the notification-based transitioning techniques described above may be implemented at one or more tiers of a multi-tier service. For example, an SRR and a redundant set of RTEs may be set up at a front-end request processing node (FRPN) of a fleet of FRPNs of a database service or a storage service. Such a service may also include a back-end layer at which some requests which cannot be fulfilled (or can only be partially fulfilled) at the front end layer may be processed. Service requests generated by clients may be directed to a given FRPN via a load balancer in some such embodiments. Note that at least in some embodiments in which SSL or a similar security protocol is used to encrypt service requests, the requests may be retained in encrypted form until they reach an FRPN (e.g., SSL may be terminated at the FRPN and not at the load balancer) to secure contents of service requests for as large a fraction of their over-the-network transfers as possible. In at least one embodiment, the notification-based transitioning techniques may be implemented at the back end layer (and/or at other intermediate layers as well, and not just at the front end layer). In some embodiments, an SRR may run at a different host than at least some of the RTEs to which it directs service requests.

Although garbage collections represent one common example of a reduced capacity phase of operations for which advance notifications of the kind indicated above may be generated and used for directing service requests, similar techniques may be employed for various other kinds of RCPs in different embodiments. Such other RCPS may include, for example, data structure re-organizations in main memory, de-fragmentation operations associated with application objects stored on persistent storage, planned live software updates, and the like.

Example System Environment

FIG. 1 illustrates an example system environment in which performance obtained for service requests received at a network-accessible service may be enhanced by directing service requests to selected virtual machines based on advance notifications of reduced capacity phases of operations, according to at least some embodiments. As shown, system 100 comprises resources of a multi-tier network-accessible service 110, such as a database service, a storage service or the like which may in some cases be implemented at a provider network or cloud computing environment. The service 110 may comprise a set of control-plane or administrative resources 180, as well as data plane resources logically grouped into at least two layers: a front-end request processing node (FRPN) layer 142 and a back-end logic node (BLN) layer 132 in the depicted embodiment. The service 110 may be designed in such a way that at least some fraction of the work required for service requests may be completed at the FRPN layer, with internal representations of those requests which cannot be completely fulfilled at the FRPN layer transmitted to the BLN layer. In one embodiment, the service 110 may not have to access state information pertaining to any one service request of a client session to process other service requests of the session; as such, the service 110 may be deemed a "stateless" service in such an embodiment.

The service 110 may implement a set of programmatic interfaces 177 which may be used by service clients to submit various types of requests from client devices 104 (e.g., desktops, laptops, mobile computing devices, phones or the like) and receive corresponding requests. In some embodiments, one or more load balancers 179 may be configured to distribute client requests among a plurality of FRPNs 140, such as FRPNs 140A, 140B or 140C. The FRPNs 140 may process received service requests if possible using locally cached data and code on various embodiments. In cases in which service requests cannot be fulfilled at the FRPNs, an internal request to perform the needed operations may be transmitted to a selected back-end logic node 130 (e.g., BLN 130A or 130B), and the response to the internal request may be forwarded (e.g., via the FRPN layer 142) to the client from which the original service request was received.

According to at least some embodiments, individual ones of the FRPNs 140 may comprise at least two categories of subcomponents: a service request receiver or relay (SRR) 155 and a redundant set of run-time environments, such as redundant virtual machine set (RVMS) 144, at which one or more front-end application instances (FAIs) 147 (e.g., 147A or 147B) may be executed at a given point in time. An SRR may comprise a security module 157 in at least some embodiments, which is responsible for operations such as decrypting encrypted streams of bytes received from load balancers 179 or directly from client devices 104. Any of various security protocols may be implemented for service requests and responses in different embodiments; for example, in some embodiments, SSL may be used, and the security module 157 may be configured to perform SSL connection termination. In the depicted embodiment, in order to ensure a high level of security with respect to the contents of service requests submitted by clients of service 110, the requests may (a) be encrypted at the client devices 104 before being sent to the service 110 and (b) remain encrypted until they reach an FRPN 140 where they are processed (i.e., the service requests may not be decrypted at an intermediary such as a load balancer 179). As such, an SRR may receive an encrypted stream of bytes from a load balancer or client, and may convert the encrypted stream into an intelligible service request that can be processed at an FAI in various embodiments. After decrypting a received message or set of messages using security module 157, for example, the SRR 155 at a given FRPN 140 may identify various headers and the body of an HTTP (HyperText Transfer Protocol) request for one or more operations to be performed on behalf of a client, and send the HTTP message to a selected FAI 147. The FAI 147 may then determine whether the requested operations can be performed at the FRPN 140, or whether the requested operation requires the participation or assistance of a BLN 130. If BLN participation is not needed, the operations may be performed locally, and a response may be provided to the requester if needed (note that some operations requested by clients may not require responses to be transmitted). If BLN participation is needed, the FAI may generate an internal request indicating the specific operations that are required from the back-end logic node layer, and send the internal request via a secure internal pathway of the service 110 to a selected BLN for processing.

In the depicted embodiment, a plurality of FAIs 147, such as 147A and 147B, may be executed at respective virtual machines 145—e.g., FAI 147A may comprise a set of byte code run at VM 145A, and FAI 147B may comprise the same set of byte code run at VM 145B. In addition to a number of other components (discussed below in further detail in the context of FIG. 5), a given VM 145 may comprise a reduced capacity phase (RCP) manager 149 such as a garbage collection manager. The RCP manager 149 may in turn comprise or have programmatic access to an RCP hint provider 146, responsible for providing advance notifications or hints about impending RCPs to the FAI 147 of the VM in the depicted embodiment. In at least some embodiments, the reduced capacity phase of operations of the VM 145 may comprise a garbage collection (GC) operation, during which memory that was allocated dynamically for various objects from a heap for the FAI 147 during some time interval may be re-arranged and/or freed if it is no longer reachable/referenced. The RCP manager 149 may monitor the allocation rate at the heap of the VM, and may thereby be able to (at least approximately) predict when the next GC may be required in various embodiments.

While at least a part of the algorithm used for garbage collection is executed, e.g., using one or more collector threads, the processing that would normally (i.e., during periods when garbage collection is not being performed) by threads of the FAI 147 may be suspended or slowed down in at least some embodiments. The threads of the FAI may be referred to as mutator threads in some embodiments, as they can perform writes or mutations to objects allocated from the heap. To enable the GC collectors to perform their cleanup/reorganization of the heap in a consistent manner, such mutations may not be allowed during at least some stages of the GC, resulting in longer times to respond to service requests and lower throughput for such requests. Note that the extent to which the application's computations are affected during a GC may vary based on numerous factors, such as the specific GC algorithm being used, the size of the heap being managed, and so on. The negative impact of GCs on the performance achieved for service requests directed to a given FAI 147 running at a VM 145 may be ameliorated by tuning heap size and garbage collection algorithms in various embodiments, but may be very hard to eliminate, especially in a scenario in which the service 110 is intended to provide very high levels of responsiveness (e.g., latencies of a few milliseconds for most service requests).

In order to overcome the negative impact of GCs, multiple VMs such as 145A and 145B may be configured to process the service requests received at a given SRR 155 in the depicted embodiment. The RCP hint provider 146 associated with a VM 145 may notify the FAI 147 running at the VM of an impending RCP, e.g., with a parameterizable advance notice. For example, in one example scenario, each VM 145 may be informed (e.g., by an RVMS configuration manager 174 of the control plane, a performance manager 173 of the control plane, or an SRR 155) that advance notice of at least T milliseconds is to be provided before a given GC is started. Such a parameter may, for example be indicated via a command line argument or flag used to launch the VM by the SRR or by a control plane component, an API invoked after the VM is launched, a parameter file read by the VM, a message delivered to the VM, or other mechanisms in various embodiments. The advance notice interval may be set to enable the FAI 147 running at the VM 145 to complete the processing of service requests which are in-flight or underway, or requests that have been accepted for processing and are currently queued. In some embodiments, the advance notice parameter may for example be set to a target maximum response time of the service 110—e.g., if the objective of the service is to handle any service request within 10 milliseconds of the receipt of the request, the parameter may be set to require a notification of an impending GC at least 10 milliseconds before the GC. Note that although each RCP hint provider 146 is shown included within a respective RCP manager 149 in FIG. 1, in at least some embodiments an RCP hint provider need not be a component of the RCP manager.

Upon receiving such a notification of an RCP from an RCP manager 149 (e.g., 149A), the FAI 147 (e.g., 147A) may in turn send a corresponding notification or message to the SRR 155 of the FRPN 140 at which the FAI is running. This may serve as a signal that the SRR 155 to stop sending further service requests to the FAI 147A, and instead send new requests for some time to FAI 147B running at a different VM (e.g., 145B) than the VM at which the RCP is about to begin. The VMs 145 of a redundant VM set 144 may be configured in such a way in various embodiments (e.g., with the appropriate heap size settings and GC algorithm settings selected) that RCPs of the member VMs of the set do not overlap in time, at least under normal operating conditions. As such, by sending requests to FAI 147B during a time period when a GC is being performed at VM 145A, the negative performance consequences of the GC may be avoided by SRR 155. Similarly, after the GC completes at VM 145A, and before a GC is scheduled at VM 145B, the service request stream may be transferred back to FAI 147A in the depicted embodiment. From the perspective of the clients on whose behalf the service requests are processed, negative impacts of GCs or other RCPs may be eliminated (or almost eliminated) by implementing such notification-based transitions in at least some embodiments. Furthermore, in embodiments in which the SRRs terminate SSL connections or perform other security related tasks, and the RVMS is implemented at the same host as the corresponding SRR, no security-related overhead may be incurred as a result of such transitions.

In the depicted embodiment, provisioning managers 172 of the control plane may be responsible for determining (e.g., dynamically) the number of FRPNs and/or BLNs to be set up on behalf of a collection of service clients, selecting the physical and/or virtual machines to be used, and configuring the machines accordingly. Performance managers 173 may monitor the response times and throughputs achieved for various kinds of service requests, and adjust the configurations of the FRPN layer 142 and/or the BLN layer 132. RVMS configuration managers 174 may be responsible for selecting the values of launch parameters (as well as values of dynamically altered parameters) used for the VMs 145, the number of VMs to be set up in a RVMS 144, and so on, in at least some embodiments. In at least some embodiments, decisions such as whether notification-based transitioning is to be implemented at all, and if so how many redundant VMs should be set up at each FRPN, may be made dynamically based on metrics collected at the performance managers 173 and analyzed at the control plane resources. Individual ones of the FRPNs 140, the BLNs 130, provisioning managers 172, performance managers 173 and RVMS configuration managers 174 may comprise some combination of software and hardware at one or more computing devices in various embodiments. According to at least some embodiments, similar sets of redundant VMs as those used at the FRPN layer may also or instead be used at the BLN layer, with RCP notification-based transitions for internal service requests. An internal request receiver at a BLN (not shown in FIG. 1) may perform analogous request distribution operations to those described with respect to the SRRs in such embodiments. In at least one embodiment, a network-accessible service may comprise more than two layers (e.g., a web server layer, an application server layer, and a storage layer) at which RTEs with predictable RCPs occur, and notification-based transitions of request streams may be implemented at several such layers. As mentioned earlier, potential negative impacts of RCPs other than GCs (such as phases during which data structures in memory are re-organized, or persistent storage objects are re-organized) may be addressed using notification based transitions in at least some embodiments.

Example Transitions of Service Request Processing Between Virtual Machines

Figure 2:
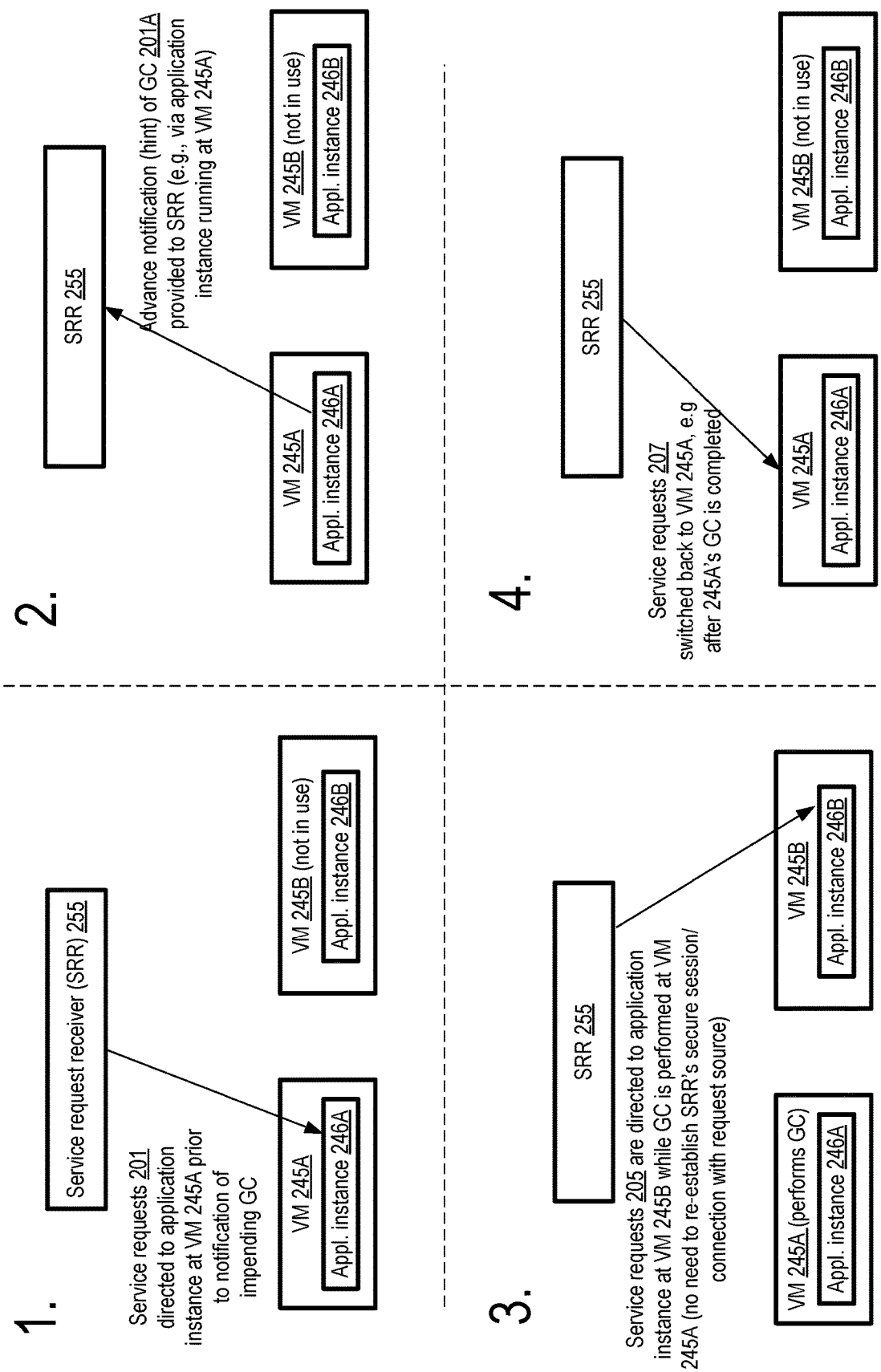
FIG. 2 illustrates an example of transitioning of service requests from one virtual machine to another based on received indications of anticipated reduced capacity phases of executions, according to at least some embodiments.

FIG. 2 illustrates an example of transitioning of service requests from one virtual machine to another based on received indications of anticipated reduced capacity phases of executions, according to at least some embodiments. Four stages of operation of a service request receiver (SRR) 255 of a network-accessible service similar in functionality and features to service 110 of FIG. 1 are shown, numbered from 1 to 4. A pair of virtual machines 245A and 245B, of which one VM is used for processing service requests at any given time while the other one remains unused. The SRR 255 may receive service requests from one or more sources (e.g., from client devices via a load balancer, or directly from client devices), and may be configured to distribute the service requests to respective application instances 246A and 246B running at the VMs based on advance indications of reduced capacity phases of operations at the VMs.

In stage 1 shown in FIG. 2, the SRR 255 directs service requests 201 to an application instance 246A running at VM 245A, and VM 245B is not in use. The application instance 246A performs one or more operations with respect to each service request that is received, consuming more heap memory of the VM 245A as it proceeds. Eventually, an internal memory management subsystem of the VM 245A determines that a GC will be scheduled soon at VM 245A.

In stage 2, an advance notification or hint 201A of the GC is provided to SRR 255. In at least some embodiments, a two-step procedure may be used, in which an initial indication of the impending GC is first provided by the VM 145A to its application instance 246A, and then from the application instance 246A another indication (e.g., using a different communication/notification mechanism) is provided to the SRR 255.

The indication of the impending GC may cause the SRR 255 to temporarily stop sending additional service requests to the application instance 246A running at VM 245A. Instead, as shown in stage 3, new service requests 205 may be directed to application instance 246B at VM 245B while the GC is performed at VM 245A.

As shown in stage 4, the SRR 255 may resume sending service requests to the first application instance 246A at some later point in time, in effect returning to stage 1, e.g., after receiving an indication that the GC of VM 245A has ended. In some embodiments, a slightly different approach may be taken with respect to transitioning back to application instance 245A—e.g., instead of resuming sending requests based on the completion of the GC of VM 245A, the SRR 255 may continue to send requests to application instance 246B until it receives an indication that a GC is about to be scheduled at VM 245B. Having re-entered stage 1, the SRR 255 may continue implementing the kinds of transitions shown in FIG. 2 in various embodiments, always choosing to send service requests to an application instance VM that is not currently hampered (with respect to request processing capability) by a GC.

Example Performance Benefits of Notification-Based Transitions

Figure 3:
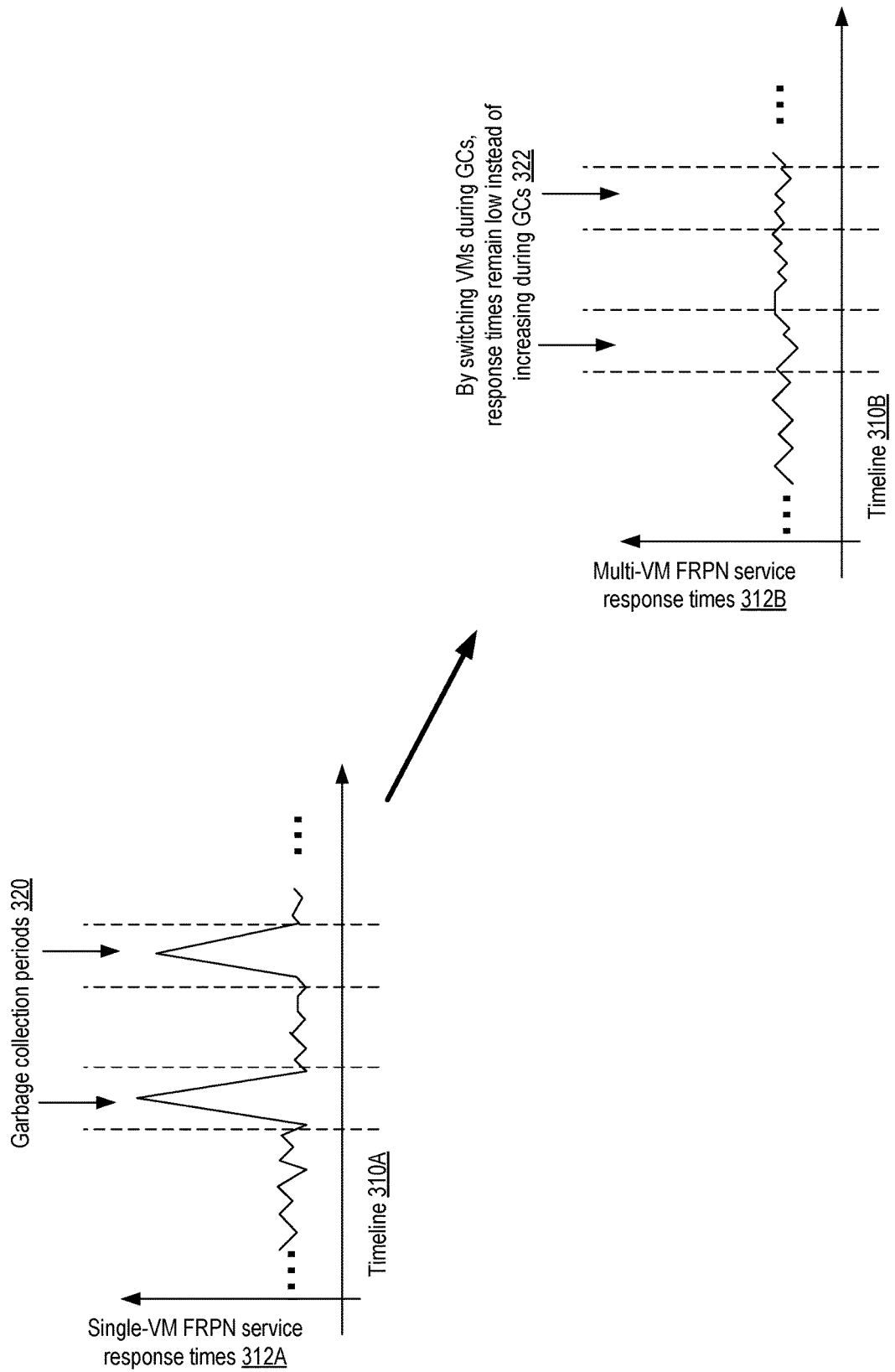
FIG. 3 illustrates an example of performance improvements which may be achieved using notification-based transitions of service requests among a plurality of virtual machines, according to at least some embodiments.

FIG. 3 illustrates an example of performance improvements which may be achieved using notification-based transitions of service requests among a plurality of virtual machines, according to at least some embodiments. Two example timelines 310A and 310B of response times for service requests directed to a network-accessible service are shown, with time along the X-axes and the average response times measured for example over successive periods of some number of milliseconds or seconds plotted along the Y-aces.

At the version of the service whose response times are presented with respect to timeline 310A, a single virtual machine (instead of a redundant set of virtual machines as shown in FIG. 1) is configured at individual ones of the front-end request processing nodes or FRPNs. Consequently, during garbage collection intervals 320, the mutator threads that implement the operations of application instances at the FRPNs are unable to make progress as quickly as they are able to during non-GC periods, and the response times rise dramatically.

At the service whose response times are shown with respect to timeline 310B, in contrast, multiple virtual machines may be configured at each FRPN, e.g., in a redundant configuration as discussed in the context of FIG. 1 and FIG. 2. As a result of always (at least under normal operating conditions) directing service requests to a virtual machine that is not undergoing a GC, the response times achieved may remain relatively flat, with none of the GC-correlated spikes shown with respect to timeline 310A. Note that GCs 322 may of course still be performed in then environment depicted with respect to timeline 310B; the difference is that the effects of the GCs are masked or hidden by using the advance notifications to repeatedly and seamlessly transition to using a VM that is not going to be affected by a GC.

Example Advance Notice Parameter

Figure 4:
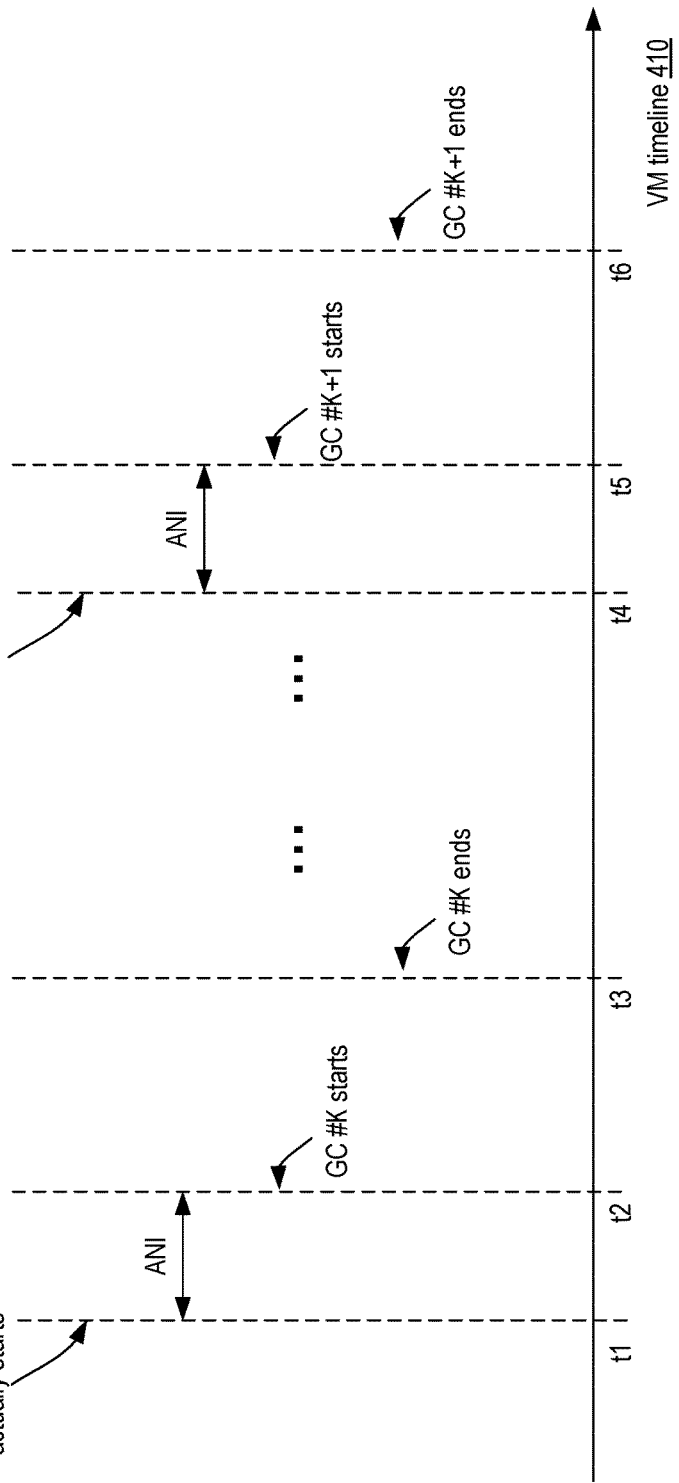
FIG. 4 illustrates an example use of a parameterizable advance notice period for handling in-flight service requests immediately prior to a garbage collection operation, according to at least some embodiments.

FIG. 4 illustrates an example use of a parameterizable advance notice period for handling in-flight service requests immediately prior to a garbage collection operation, according to at least some embodiments. Events associated with a pair of garbage collection operations, labeled GC #K and GC #K+1 are shown along a virtual machine's (VM's) timeline 410 in FIG. 4.

In the depicted embodiment, a value of an advance notice interval (ANI) parameter 405 may be provided to the virtual machine, indicating the amount of time by which a notification or indication of a GC which is about to be scheduled is to precede the start of the GC. Thus, for example, GC #K starts at time t2 (and ends at time t3), but the hint or indication regarding the starting of GC #K is provided at time t1, where the difference between t2 and t1 (i.e., t2−t1) equals ANI. Similarly, GC #K+1 starts at time t5 (and ends at time t6), but the hint or indication regarding the starting of GC #K+1 is provided at time t4, where the difference between t5 and t4 (i.e., t5−t4) equals ANI. In some embodiments, the value selected for ANI may be exceeded by the VM—that is, if ANI is expressed in milliseconds for example, the notification or hint of a given GC may be provided no later than ANI milliseconds before the start of the GC.

The value of the ANI parameter may be selected based on various factors in different embodiments, and may be communicated to the VM using any of a number of different mechanisms. One of the motivations for setting ANI in some embodiments may include the consideration that the VM at which the GC is about to be performed should ideally be able to complete processing requests that have already been directed to that VM, as causing such in-flight requests to have to be transitioned to a different VM may be problematic (or in some cases impracticable). As such, ANI may be chosen to allow the average number of requests that are usually queued or in progress at a VM to complete in such embodiments. In some embodiments, as mentioned earlier, the ANI may be selected simply based on a target response time selected as an objective of the service. In at least one embodiment, an ANI may not necessarily be expressed in time units—instead, for example, the advance notice may be required to be provided when say X % of the heap remains free, or when the percentage of the heap that is free reaches a range between X % and Y %.

In some embodiments, the ANI parameter setting may remain fixed during the lifetime of a VM, and may for example be indicated via a startup command line parameter of the VM. In other embodiments, mechanisms such as dynamically modifiable parameters, dynamically read parameter files, or messages/notifications sent to the VM may be used to set ANI values, and the values may be modified during the lifetime of the VM. In some embodiments, the service request receiver associated with the VM may select the ANI value. In other embodiments, components of the control plane of the service at which the VM is configured may select the value, e.g., based on analysis of various metrics collected with respect to the service requests and/or the resources used for the VMs. In at least one embodiment, a client of the service may provide an indication of a desired ANI via a programmatic interface, or may even be able to programmatically request that the notification-based request transitioning technique be enabled or disabled for their requests.

Example Virtual Machine Architecture

Figure 5:
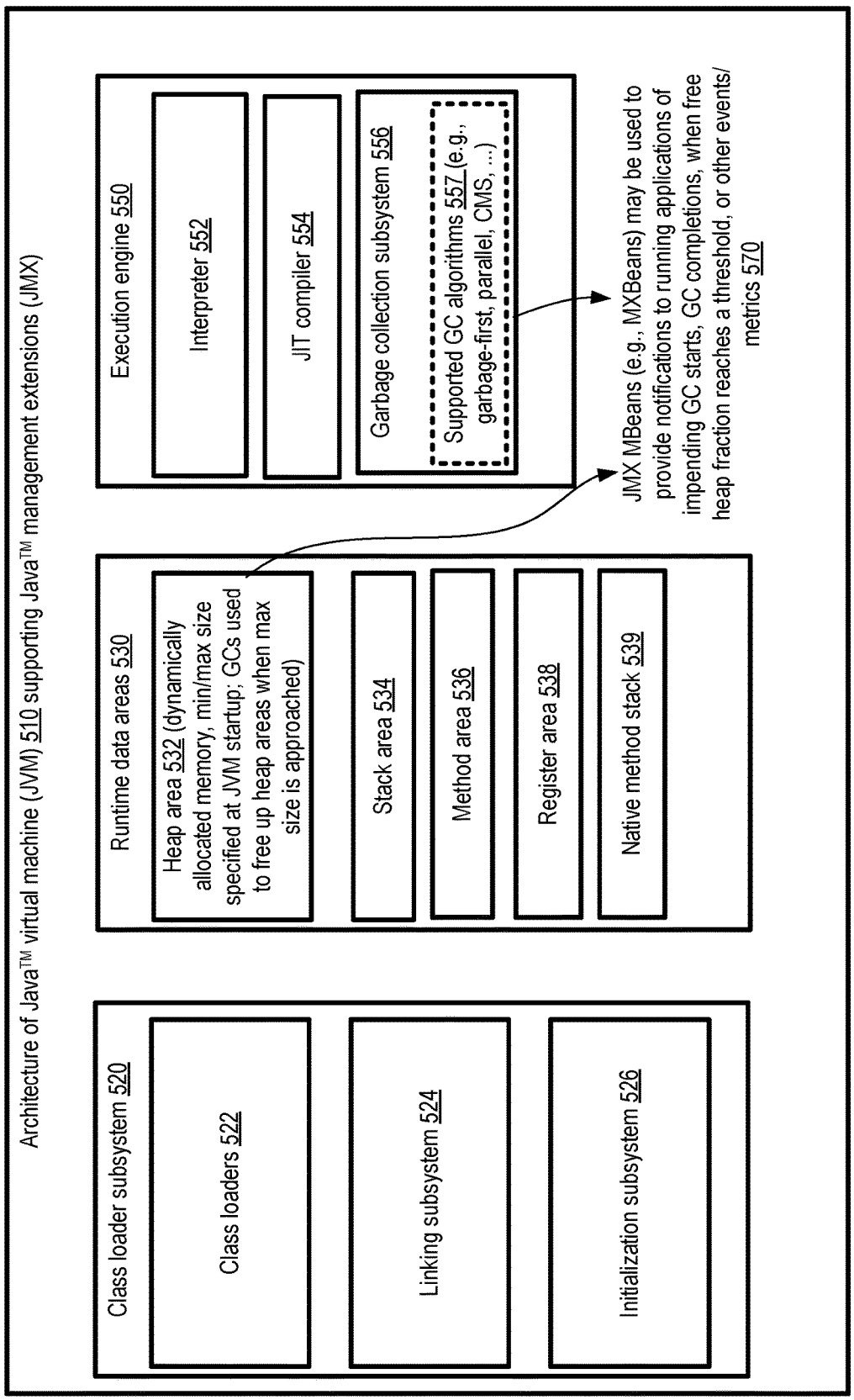
FIG. 5 illustrates example components of a virtual machine architecture which may be used for processing client-submitted requests at a network-accessible service, according to at least some embodiments.

FIG. 5 illustrates example components of a virtual machine architecture which may be used for processing client-submitted requests at a network-accessible service, according to at least some embodiments. The architecture of a Java™ virtual machine (JVM) 510 is shown by way of example in FIG. 5. Note, however, that the notification-based performance enhancement techniques described herein may be employed with equal success using other types of virtual machine architectures, software containers, straightforward non-virtualized operating systems, and/or other types of run-time environments in various embodiments. In at least some embodiments, the JVM 510 may support Java™ management extensions (JMX), which may be used to provide the kinds of advance notifications of garbage collections discussed earlier to an application instance running at the JVM, and/or to provide values of the advance notification interval parameter discussed in the context of FIG. 4.

At a high level, the JVM 510 may comprise three components or subsystems: class loader subsystem 520, runtime data areas 530 and an execution engine 550. The programs (including application instances of the kind discussed above, such as FAIs 147 of FIG. 1) to be run at the JVM may comprise byte code organized as a collection of class files, which are dynamically loaded by the class loader subsystem as needed. The collection of class loaders 522 may, for example, include a bootstrap class loader (responsible for loading classes from a bootstrap class path configured for the JVM), an extension class loader (responsible for loading classes from a special extensions folder) and an application class loader (responsible for loading application-specific classes) in some embodiments. The linking subsystem 524 may verify if the byte code being loaded is acceptable, allocate memory for static variables, and resolve symbolic memory references. The initialization subsystem 526 may assign initial values to static variables and execute the static initialization block (if any) of the program.

Runtime data areas 530 may include a heap area 532, a stack area 534, a method area 536, a register area 538 and a native method stack area 539 in the depicted embodiment. The heap may represent the dynamically allocated memory of the program or application being run, within which instance variables and arrays referenced in the program may be stored. In at least some embodiments, a minimum and/or maximum heap size for the JVM 510 may be specified via command-line arguments at startup, along with various other memory management parameters such as the specific garbage collection (GC) algorithm to be used. As mentioned earlier, GCs may be used to free up heap areas when the amount of used (e.g., written-to) heap memory approaches or reaches the maximum. Each time a GC algorithm is implemented during the lifetime of the JVM 510 may be referred to as a respective GC cycle in some embodiments. The stack area 534 may include space for a respective runtime stack for various threads of the JVM, with a stack frame being added for each method call. The method area 536 may be used to store class level data including static variables. The register area 538 may include program counter registers for each thread, used to indicate the address of the instruction being executed. The JVM 510 may also include support for so-called native methods (methods whose implementation is written in a language other than Java™, such as C or C++), and a respective native method stack 539 may be allocated for each thread.

The execution engine 550 may be responsible for executing the bytecode of the programs being run at the JVM. The interpreter 552 may interpret the bytecode, e.g., if the code has not yet been compiled by the JIT (just in time) compiler 554. If a method is called repeatedly, the JIT compiler may transform the byte code into executable native code for the physical machine on which the JVM runs, thus achieving performance improvements relative to interpreted byte code.

The garbage collection subsystem 556 may support a variety of GC algorithms 557, such as garbage-first, concurrent mark and sweep (CMS), parallel GC, and the like in the depicted embodiment. The particular algorithm to be used may be indicated by a command line flag at the time the JVM is launched in some embodiments. In various embodiments, a technology called "managed beans" or MBeans may be used for monitoring and/or reporting on aspects of the operation of the JVM, including for example GC operations. Several different types of MBeans may be supported in some embodiments, including for example standard MBeans, dynamic MBeans, and MXBeans (also known as platform MBeans, which can be used to monitor and provide notifications regarding garbage collection, JIT compilation, memory pools, multi-threading etc.). In one embodiment, one or more such MXBeans may be employed to implement the advance notifications of garbage collection operations discussed earlier. Applications (e.g., the front-end application instances similar to FAIs 147 of FIG. 1) running at the JVM (or running remotely) may interact with such MXBeans using any of several mechanisms such as JMX connectors and protocol adapters in some embodiments. Note that technologies other than JMX MBeans may be used to implement the advance notification of GCs and/or other reduced capacity phases of operations in at least some embodiments. As mentioned earlier, run-time environments other than JVMs may be employed for processing service requests using advance notifications of reduced capacity phases of operations in at least some embodiments.

Examples of Reduced Capacity Phases of Operations

Figure 6:
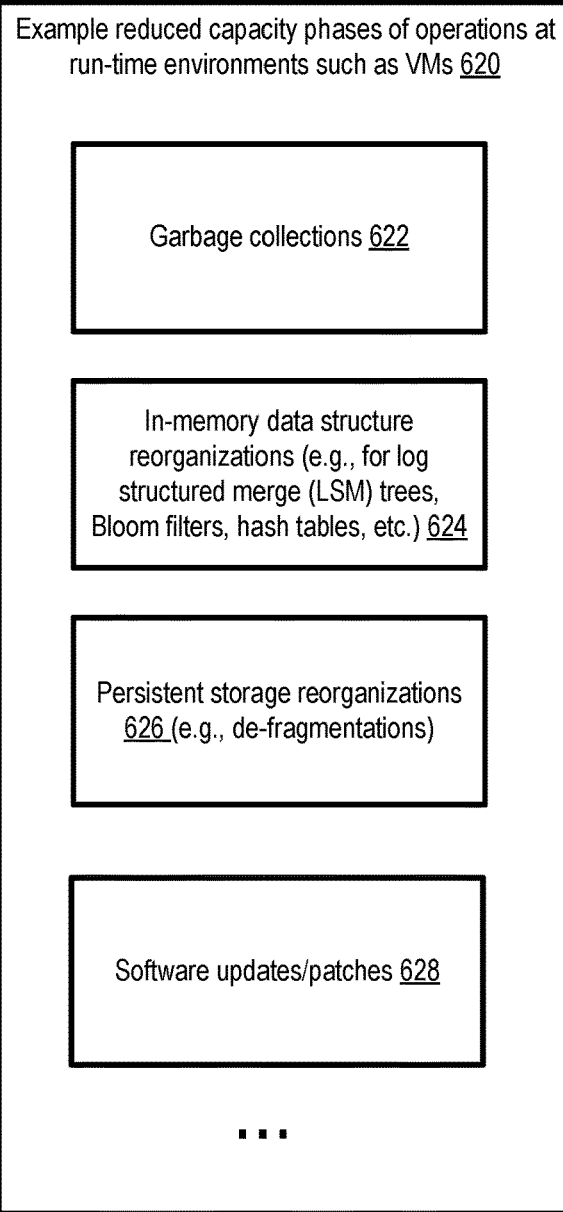
FIG. 6 illustrates examples of reduced capacity phases of operations at a run-time environment used for a network-accessible service, according to at least some embodiments.

FIG. 6 illustrates examples of reduced capacity phases of operations at a run-time environment used for a network-accessible service, according to at least some embodiments. In each of the examples shown in FIG. 6, the run-time environment may exhibit the following characteristics: (a) there may be period of operation during which internal administrative tasks, not directly requested by service clients, may have to be performed in effect at a higher priority than client-requested tasks, thus reducing the resource capacity that can be dedicated to the client-requested tasks, (b) such reduced capacity phases may be schedulable or predictable in advance, and (c) mechanisms for providing hints or notifications regarding the reduced capacity phases, directly or indirectly, to an upstream component of the service which can direct service requests elsewhere, may be available.

Garbage collections 622, as discussed earlier, represent one common example of such reduced capacity phases 620. A number of applications may use in-memory data structures such as LSM (log structured merge) trees, Bloom filters, various types of hash tables and the like which may benefit from re-organization, re-balancing or cleanup operations over time. Such in-memory data structure reorganizations 624 may also reduce the capacity of the applications to process service requests temporarily, and may thus also benefit from the advance notification-based switching of service requests between run-time environments.

For some applications, persistent storage objects may also or instead have to be re-organized, e.g., using de-fragmentation algorithms or the like. Such persistent storage reorganizations 626 may represent another example of reduced capacity phases for which the techniques described herein may be implemented to improve performance. Another scenario which may benefit from the notification-based switching of requests may involve applying software updates or patches 628 (e.g., via live updates in which the service or application is not taken offline). Notification-based switching of request streams among redundantly-configured groups of run-time environments may also be employed for scenarios not shown in FIG. 6 in some embodiments.

Example Symmetric and Asymmetric Configurations of Redundant Virtual Machines

Figure 7:
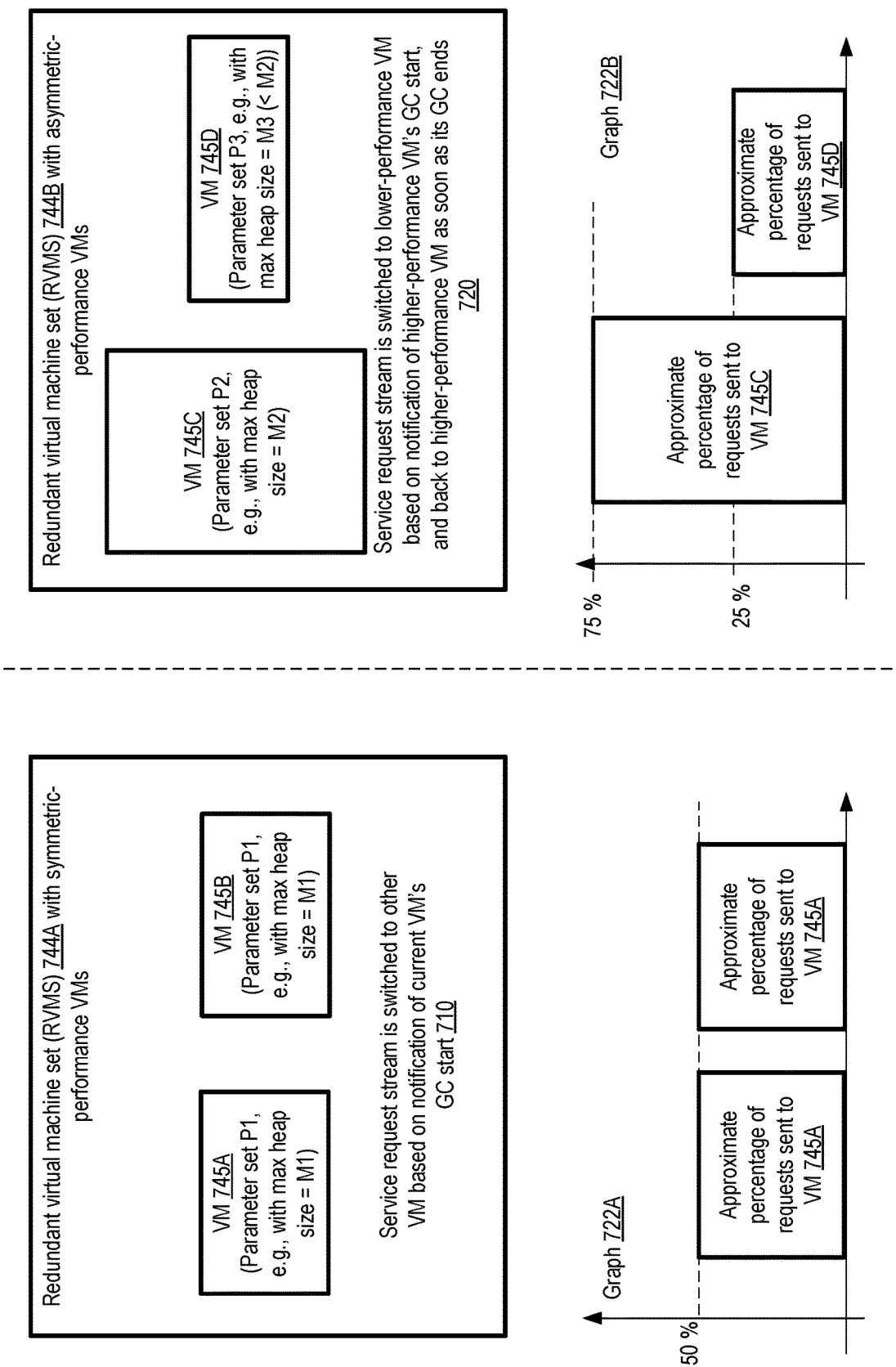
FIG. 7 illustrates examples of symmetric and asymmetric configurations of redundant virtual machine sets, according to at least some embodiments.

In various embodiments, as discussed earlier, a redundant set of run-time environments such as virtual machines may be configured to reduce the impact of reduced capacity phases on service request processing. FIG. 7 illustrates examples of symmetric and asymmetric configurations of redundant virtual machine sets, according to at least some embodiments.

In redundant virtual machine set (RVMS) 744A, comprising symmetric-performance virtual machine pair 745A and 745B, each of the virtual machines of the set may have the same value set for at least some performance-related configuration settings. For example, parameter set P1, with a maximum heap size M1, may be used for both the VMs. At a given time, service requests may be directed to one VM of the pair. Service request streams may be switched from the currently in-use VM of RVMS 744A to the other based on an advance notification of the start 710 of a garbage collection of the currently in-use VM. Because both VMs provide similar levels of performance, approximately 50% of the total service requests being handled collectively by the RVMS 744A may be handled by each of the VMs 745A and 745B, as indicated in graph 722A.

In RVMS 744A, one VM of the symmetric pair of VMs may be unused for about 50% of the time. In a different approach illustrated in RVMS 744B, different parameter sets P2 and P3 may be used for VMs 745C and 745D, and one of the VMs may be used for a larger fraction of requests than the other. For example, in parameter set P2, the maximum heap size may be M2, while a smaller maximum heap size M3 may be specified for VM 745D. Other parameters may also be varied between the two VMs in an asymmetric configuration in some embodiments—e.g., different GC algorithms may be chosen for the two VMs, different byte-code optimization techniques may be used for the two VMs, and so on. As a result of the differences in the capabilities between VM 745C and 745D, a slightly different approach may be used to transition service request streams between the two in the embodiment depicted in FIG. 7. In a scenario in which service requests are initially being directed to the higher-capacity VM 745C, the service requests may be directed to VM 745D in response to a notification of an impending GC at VM 745C, and the stream of requests may be again directed to VM 745D as soon as the GC at VM 745C ends (instead of continuing to use VM 745D until VM 745D's own GC starts). The parameters of VM 745D may be selected in such a way that the GC of VM 745C is likely to be completed before a GC at VM 745D is required in the depicted embodiment. Graph 722B shows an example breakdown of the service requests handled by the two VMs of RVMS 744B, e.g., with 75% of the requests being processed at VM 745C and the remaining 25% being processed at VM 745D. The percentages shown in graph 722B represent just one example of an asymmetric distribution of service requests; other ratios of request handling between the virtual machines of a redundant set may be achieved in different embodiments.

Example Host Mappings

Figure 8:
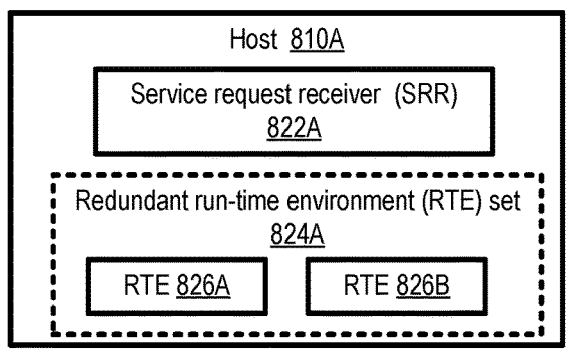
FIG. 8 illustrates example mappings of service request receivers and run-time environments to hosts, according to at least some embodiments.
Figure 8:
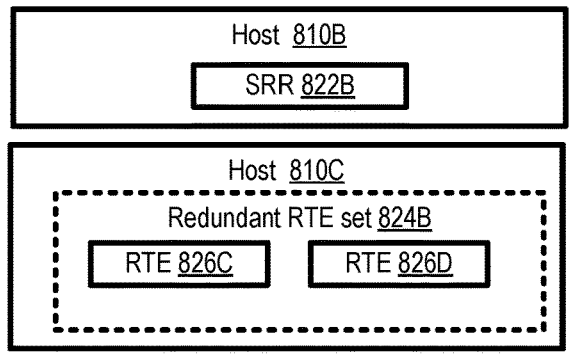
Figure 8:
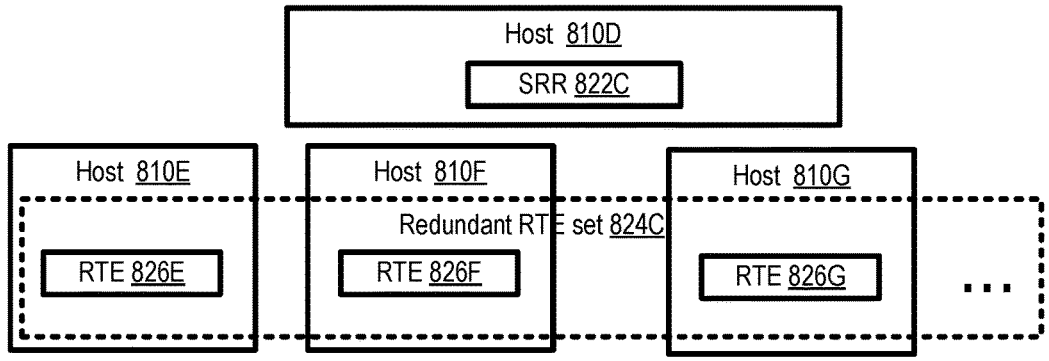

The notification-based service request transitioning techniques discussed above may be used with a number of different hardware/software configurations—that is, the manner in which the upstream components and the redundant run-time environments are distributed among computing devices or hosts may vary in different embodiments. FIG. 8 illustrates example mappings of service request receivers and run-time environments to hosts, according to at least some embodiments. In configuration 801A, a service request receiver (SRR) 822A as well as all the run-time environments of redundant set 824A, such as RTE 826A and 826B, may all be set up at the same host 810A. This approach may be a good option in embodiments in which the SRR is responsible for terminating SSL and/or for performing other security operations or connection management operations with respect to received service requests, and in which the network-accessible service is designed to ensure that service requests remain encrypted until they reach a host where they will be processed or fulfilled.

In some embodiments in which such security requirements are not applicable, but it may still be beneficial to share at least some host resources (e.g., installed software libraries, specialized hardware components or the like) among the run-time environments of a redundant set, a configuration similar to 802 may be employed. Here, one host 810B is used for an SRR 822B, while a second host 810C is used for both RTEs 826C and 826D of a redundant RTE set 824B.

In a third approach shown in configuration 803, the RTEs of redundant set 824C may themselves be distributed among several different hosts, e.g., RTE 826E may be set up at host 810E, RTE 826F may be set up at host 810F, and RTE 826G may be established at host 810G, while the SRR 822C is run at host 810D. Such an arrangement may lead to higher levels of fault resilience that the other approaches shown, as a failure of one or more of the hosts used for the RTEs may still allow the SRR 822C to distribute service requests among the remaining RTEs.

In at least some embodiments, regardless of the manner in which RTEs such as virtual machines are distributed among hosts, and regardless of whether the RTEs are co-located with the SRRs at the same host, the number of RTEs configured for processing service requests directed from a given SRR may be dynamically changed over time. For example, based on an analysis of performance metrics collected from the RTEs, the application instances run at the RTEs, and/or from client-side components of the service, a decision may be made (e.g., at a control plane component of the service) that an additional RTE should be set up to handle the workload associated with a given SRR, and such an RTE may then be launched. Similarly, based on analysis of such metrics, one or more RTEs of a redundant set 824 may be terminated in some cases. In at least one embodiment, such data-driven or metrics-driven decisions may be made regarding whether to use a redundant set of RTEs for an SRR at all, or whether to continue using a redundant set of RTEs for an SRR. For example, it may be possible in one scenario to detect that the rate at which service requests are being received at a given SRR has fallen below a threshold, such that the negative consequences of reduced capacity phases of a single RTE can be ignored, and the notification-based transitioning technique may no longer be needed.

In at least one embodiment, the notification-based transitioning technique described herein may be employed in an environment in which software defined networking (SDN) is used, so that networking configuration operations such as the assignment of network addresses to components such as load balancers, SRRs and RTEs are done entirely in software. In such cases, the SRRs and RTEs may be distributed in any desired fashion among physical hosts, e.g., including any of the approaches shown in FIG. 8. Other service-component-to-host mapping approaches than those discussed here or shown in FIG. 8 may be used in some embodiments.

Example Provider Network Environment

Figure 9:
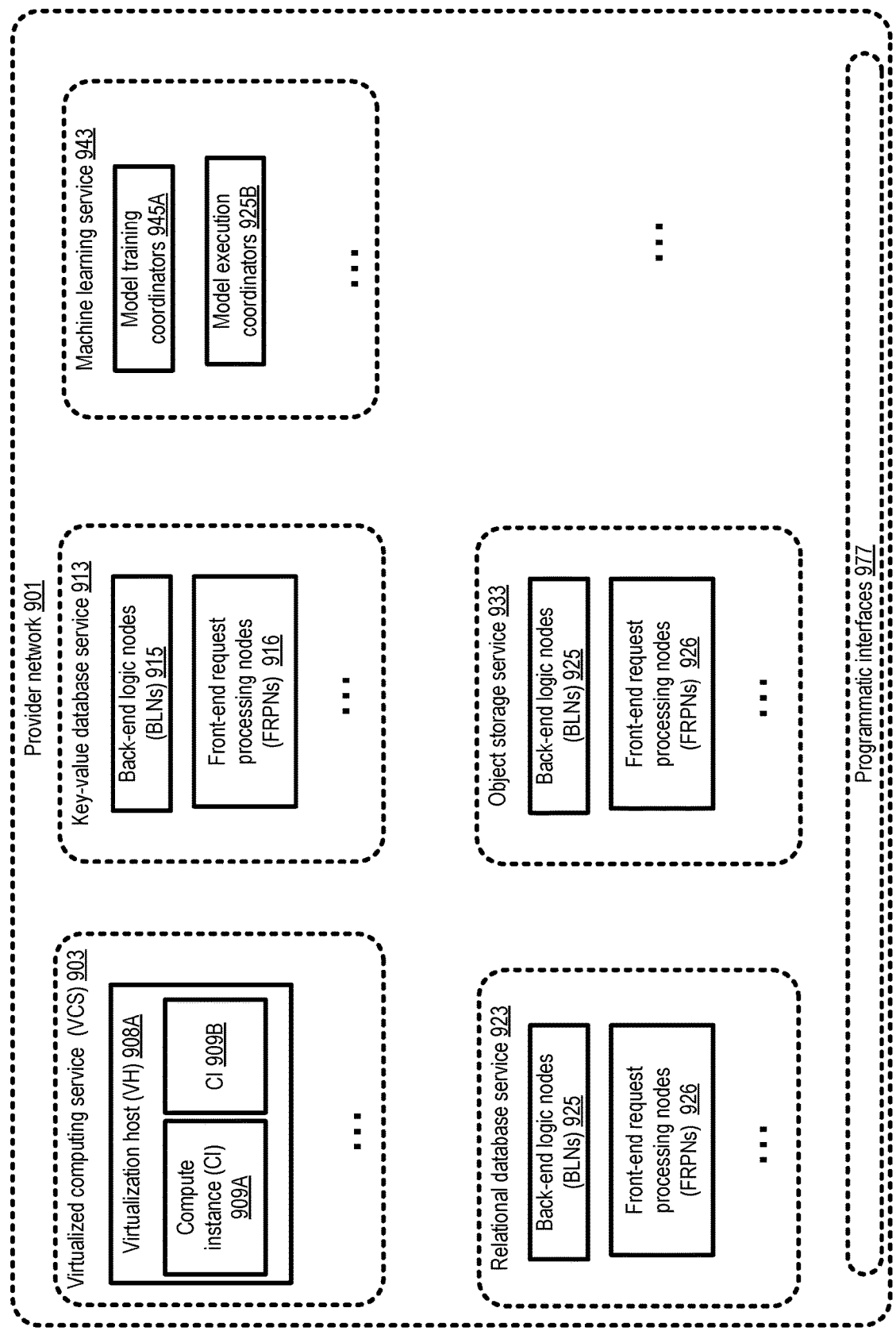
FIG. 9 illustrates an example provider network environment in which one or more services may utilize notification-based techniques to enhance service performance, according to at least some embodiments.

FIG. 9 illustrates an example provider network environment in which one or more services may utilize notification-based techniques to enhance service performance, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 901 may comprise resources used to implement a plurality of services, including for example a virtualized computing service (VCS) 903, a relational database service 923, an object storage service 933, a key-value database service 913 (which may also be referred to as a NoSQL service), and a machine learning service 943. Each of the services may include a respective set of computing devices and/or other resources in some embodiments. Components of a given service may utilize components of other services in the depicted embodiment—e.g., compute instances (CIs) 909A or 909B, implemented at a virtualization hosts 908A of the virtualized computing service 403 and/or nodes of the storage and database services may be used by model training coordinators 945A or model execution coordinators 925B of the machine learning service 843 or various other services of provider network 901. Individual ones of the services shown in FIG. 8 may implement a respective set of programmatic interfaces 877 which can be used by external and/or internal clients (where the internal clients may comprise components of other services) in the depicted embodiment.

As shown, several of the services of provider network 901 may comprise a respective layer of front-end request processing nodes (FRPNs) and back-end logic nodes (BLNs), implementing a service architecture similar to that of service 110 shown in FIG. 1. For example, key-value database service 913 may comprise BLNs 915 and FRPNs 916, relational database service 923 may comprise BLNs 925 and FRPNs 926, object storage service 933 may comprise BLNs 925 and FRPNs 926. In at least some embodiments, service request receivers and redundant sets of run-time environments similar to those discussed in the context of FIG. 1 may be instantiated at the FRPNs of such services, and notification based switching of service requests between the run-time environments may be implemented at such FRPNs. As a result, response times for service requests (which may originate either within the provider network, e.g., at compute instances of the VCS 903 or at the machine learning service 943, or from client devices outside the provider network) may be maintained at desired low levels at such services, and the negative effects of reduced capacity phases at the run-time environments may be mitigated.

Methods for Notification-Based Transitions for Request Processing

Figure 10:
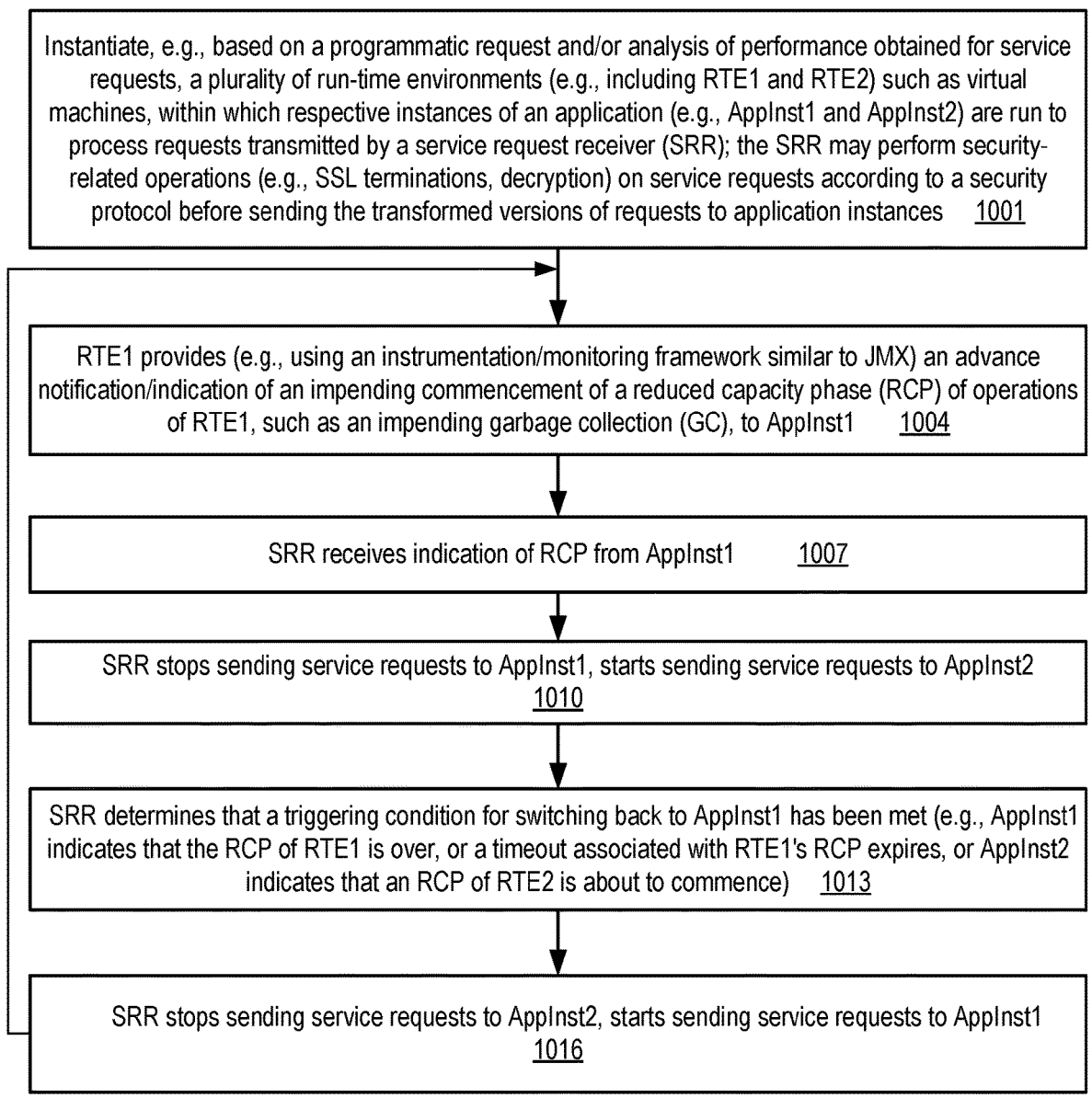
FIG. 10 is a flow diagram illustrating aspects of operations that may be performed to enhance service performance using notification-based transitions between request processing instances, according to at least some embodiments.

FIG. 10 is a flow diagram illustrating aspects of operations that may be performed to enhance service performance using notification-based transitions between request processing instances, according to at least some embodiments. As shown, in element 1001, a plurality of run-time environments (including for example RTE1 and RTE2) such as respective virtual machines may be instantiated at a network-accessible service. Each such RTE may be used to run a respective instance of an application (e.g., AppInst1 may be executed at RTE1, and AppInst2 may be executed at RTE2) configured to process service requests transmitted to the instance from a service request receiver (SRR). In some embodiments, a programmatic request may be received from a client of the service, requesting the establishment of such redundant RTEs. In other embodiments, the redundant RTEs may be established by default on behalf of at least some of the service clients, or for all clients. In one embodiment, a determination may be made, e.g., at a control plane component of the service, as to whether redundant RTEs are to be established or not. For example, initially only a single RTE may be set up for the requests received at the SRR in such an embodiment, and metrics such as service request fulfillment times and throughputs may be collected for some time. If the metrics indicate that a performance criterion or service-level agreement is not being satisfied or is in jeopardy of non-compliance, the redundant configuration may be established.

In some embodiments, the RTEs may be launched by the SRR; in other embodiments, they may be launched by control plane components or agents of the service. The SRR and the RTEs may be instantiated at the same host in some embodiments, or distributed among several hosts using one of the approaches discussed in the context of FIG. 8 in other embodiments. In at least one embodiment, the SRR may perform one or more security-related operations with respect to service requests, such as terminating SSL connections, decrypting/extracting the service requests from encrypted messages transmitted from a load balancer of the service or directly from client devices, and so on, before sending transformed/extracted versions of the service requests on to the application instances. Any of a number of different security protocols and/or algorithms (e.g., Transport Layer Security (TLS), ssh (secure shell), IPSec (Internet Protocol Security), etc.) may be used in some embodiments to secure the contents of service requests in transit, i.e., before they reach the hosts at which the SRRs and/or the RTEs are instantiated.

In the embodiment depicted in FIG. 10, at least one of the RTEs (e.g., RTE1) may provide an advance notification of an impending or anticipated commencement of a reduced capacity phase (RCP) of operations at the RTE (such as a garbage collection cycle) to its application instance AppInst1 (element 1004). In at least some embodiments, an advance notification interval parameter may be provided to the RTE, indicating for example by at least how many milliseconds the notification of the RCP is to precede the actual start of the RCP. The parameter may be provided via a command line flag, a parameter file, an API invoked after the RTE is launched, or various other methods in different embodiments. Such advance notice may enable the application instance at the RTE at which the RCP is about to begin to complete already-received service requests in various embodiments, and the amount of advance notice may be selected (e.g., by the SRR or control plane components of the service) based on such factors as the average number of in-flight service requests at the application instances, the response time goals of the service, and so on. In at least some embodiments, the RTEs may support an instrumentation/monitoring framework similar to JMX, and the notifications/hints of the approaching RCP may be provided using such a framework (e.g., using JMX MXBeans), In one embodiment, for example, the garbage collection subsystem of an RTE may monitor the rates at which mutator threads have been allocating heap memory, and may be able to extrapolate to the time at which the next garbage collection cycle is likely to commence. Given such an extrapolation and the advance notice interval parameter, the garbage collection subsystem may be able to schedule a notification of a soon-to-start garbage collection cycle with the requested advance notice. In at least one embodiment, the notification provided by the RTE may include not only an indication of the start of the RCP (including for example when the RCP is expected to begin) but also an indication of the duration of the RCP (i.e., when the RCP is expected to end). In other embodiments, information regarding the ending of the RCP may not be provided.

The SRR may receive an indication of the impending RCP from the application instance (e.g., AppInst1) in the depicted embodiment (element 1007). The application instance may for example forward the message it received from the RTE indicating the approaching RCP, or transform/re-format the message and send the transformed message to the SRR. The information obtained at the SRR may serve as a signal to the SRR to stop sending new service requests to AppInst1, and instead start sending service requests to AppInst2 at RTE2 (element 1010). Some number of subsequent service requests may then be sent by the SRR to AppInst2.

The SRR may eventually determine that a triggering condition for switching requests back to AppInst1 has been met (element 1013). Any of a number of conditions may trigger this type of reverse switch in different embodiments. For example, in some embodiments, AppInst1 may receive a notification from RTE1 when the RCP of RTE1 is completed, and forward a corresponding notification to the SRR. In other embodiments, as mentioned above, the SRR may receive (e.g., as part of the notification of the start of the RCP) an indication of an estimated duration of the RCP, and an expiration of a timeout or time period corresponding to the estimated duration may serve as the triggering condition. A third triggering condition used in some embodiments may for example comprise receiving a notification from the currently-in-use RTE, RTE2, via its application instance AppInst2, that RTE2 is about to commence its own RCP. In response to detecting the triggering condition, the SRR may stop sending requests to AppInst2, and instead resume sending them to AppInst2 (element 1016).

In at least some embodiments, the information provided to the SRR regarding impending RCP commencements, terminations and the like need not necessarily be completely accurate for the benefits of improved response times and throughputs to be achieved. For example, if an SRR is notified that a GC cycle at RTE1 is going to begin in T milliseconds, but the GC actually begins after (T+2) milliseconds or (T+5) milliseconds, the benefits of switching to RTE2 may still be obtained even though the estimated timing start of the GC was predicted slightly incorrectly. In some embodiments, the components of the service responsible for predicting the timings of events such as GC starts and GC ends may be programmed to add configurable adjustment factors to their estimates in an attempt to ensure that service requests do not have to be processed during RCPs, even if some idle time is added as a result of such adjustment factors—e.g., a given RTE may not receive service requests for a few milliseconds even when it is in a position to handle such requests efficiently.

The cycle of operations corresponding to elements 1004 onwards may be repeated as more requests are received and processed in various embodiments. Note that in at least one embodiment, the number of RTEs and application instances configured may not necessarily be limited to two—e.g., instead of switching back and forth between AppInst1/RTE1 and AppInst2/RTE2, the SRR may transition between AppInst1/RTE1, AppInst2/RTE2 and AppInst3/RTE3, and so on. In at least one embodiment, new RTEs running corresponding application instances may be configured dynamically, e.g., by a control plane component of the service, based on analysis of metrics obtained with respect the current configuration of RTEs and application instances. Similarly, in some embodiments, one or more RTEs of a redundant group of RTEs may be terminated if an analysis of collected metrics indicate that they are no longer required to meet the performance goals of the service. In some embodiments, RTEs with similar or equivalent performance capacities (e.g., with identical heap size parameters) may be configured within a redundant RTE set of an SRR; in other embodiments, an asymmetric configuration may be used, in which some RTEs of a redundant set have lower usage resource limits (such as heap sizes) than others.

It is noted that in various embodiments, some of the operations shown in FIG. FIG. 10 may be implemented in a different order than that shown in the figure, or may be performed in parallel rather than sequentially. Additionally, some of the operations shown in FIG. 10 may not be required in one or more implementations.

Use Cases

The techniques described above, of configuring redundant groups of virtual machine or other run-time environments which can proactively warn request sources regarding the scheduling of reduced capacity phases of operation, and switching service requests between such environments, may be useful in a variety of scenarios. Many modern large-scale applications and services (e.g., provider network-based database and storage services) are designed to provide their end users with very high consistent levels of performance, such as single-digit millisecond response times for at least some types of requests. In scenarios in which JVMs or other similar run-time environments which have (at least somewhat) predictable periods of reduced performance such as garbage collections are used to process service requests, meeting such stringent performance requirements may become problematic, even with extensive performance tuning. By modifying the run-time environments to use efficient notification mechanisms such as JMX to provide parameterizable advance warnings of the reduced performance phases, and by ensuring (using such warnings) that service requests are sent only to run-time environments that are not currently within such phases, it may become much easier for the services to meet the performance requirements, and less effort may be required for performance tuning.

Illustrative Computer System

Figure 11:
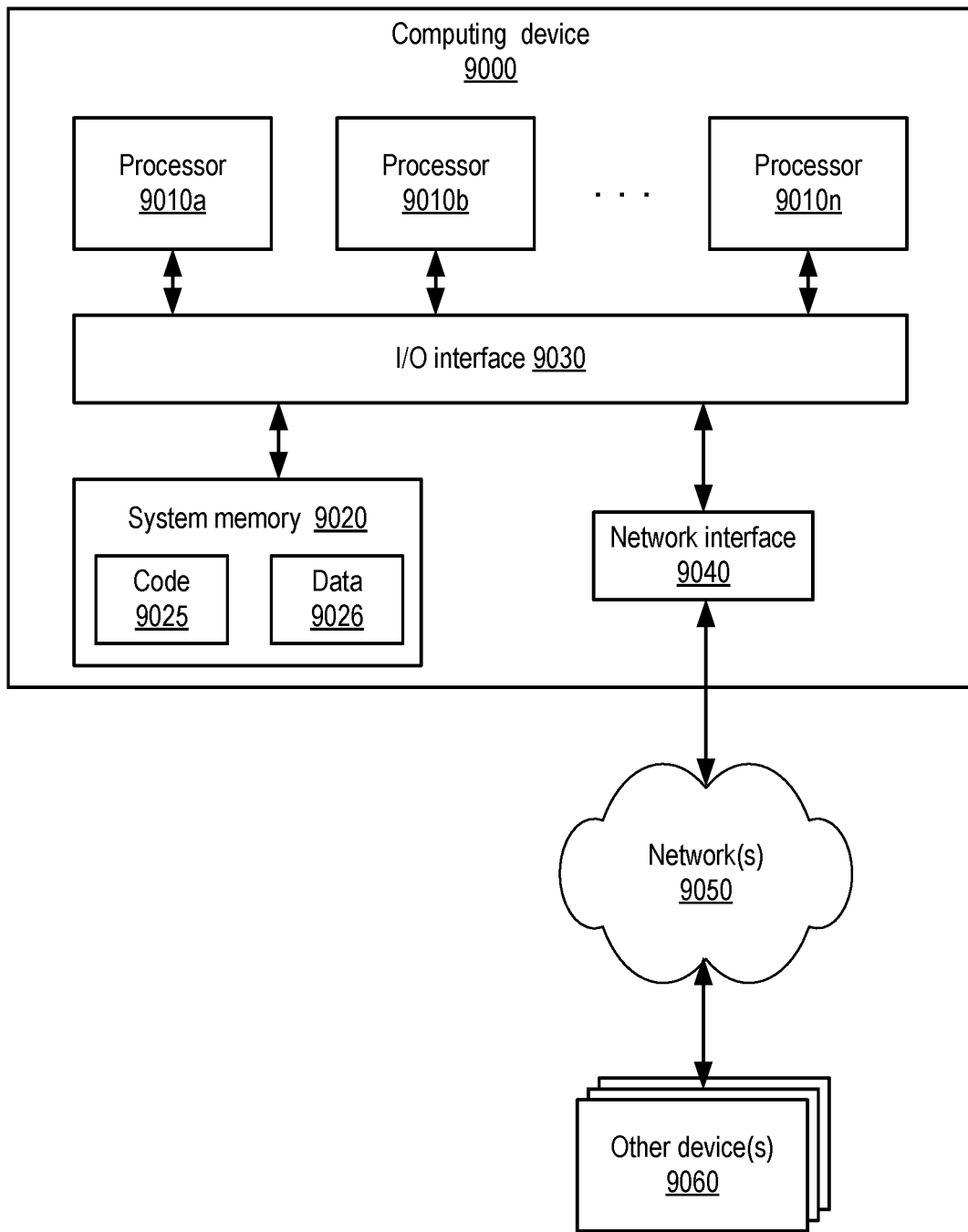
FIG. 11 is a block diagram illustrating an example computing device that may be used in at least some embodiments.

In at least some embodiments, a server that implements a portion or all of one or more of the technologies described herein, including the techniques for implementing various data plane and control plane components of a network accessible service, such as service request receivers and run-time environments at which request processing application instances are executed may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
cause to be instantiated, at a host of a network-accessible service, (a) a service request receiver, (b) a first virtual machine executing a first instance of an application which performs one or more operations to fulfill respective service requests, and (c) a second virtual machine executing a second instance of the application;
wherein the first virtual machine is configured to:
schedule a first indication of an impending commencement of a garbage collection of the first virtual machine based at least in part on a time interval by which the first indication is to precede the commencement of the garbage collection; and
prior to the commencement of the garbage collection by at least the time interval, provide, from the first virtual machine to the first instance of the application executing on the first virtual machine, the first indication of the impending commencement of the garbage collection of the first virtual machine; and
wherein the service request receiver is configured to:
obtain, from the first instance of the application, a second indication of the impending commencement of the garbage collection;
perform one or more operations of a security protocol to extract a service request from an encrypted set of bytes received via a network connection;
determine, based at least in part on the second indication, that the service request is not to be directed to the first instance of the application; and
direct the service request to the second instance of the application.

2. The system as recited in claim 1, wherein the service request receiver is further configured to:
obtain an indication that the garbage collection has been completed at the first virtual machine; and
direct a subsequent service request to the first instance of the application, based at least in part on the indication that the garbage collection has been completed.

3. The system as recited in claim 1, wherein the service request receiver is further configured to:
obtain an indication of an estimated duration of the garbage collection; and
direct a subsequent service request to the first instance of the application, based at least in part on a completion of a time period corresponding to the estimated duration.

4. The system as recited in claim 1, wherein the first virtual machine is further configured to:
obtain an indication of the time interval by which the first indication of the impending commencement of the garbage collection is to precede the commencement of the garbage collection.

5. The system as recited in claim 1, wherein the one or more computing devices include further instructions that upon execution on or across the one or more processors further cause the one or more computing devices to:
allocate a first set of resources to the first virtual machine based on a first set of parameters, wherein the first set of parameters includes a first maximum amount of heap memory; and
allocate a second set of resources to the second virtual machine based on a second set of parameters, wherein the second set of parameters includes a second maximum amount of heap memory which differs from the first maximum amount of heap memory.

6. A method, comprising:
performing, at one or more computing devices:
instantiating (a) a service request receiver, (b) a first run-time environment executing a first instance of an application, and (c) a second run-time environment executing a second instance of the application;
scheduling, by the first run-time environment, a first indication of an impending commencement of a reduced-capacity phase of operation of the first run-time environment based at least in part on a time interval by which the first indication is to precede the commencement of the reduced-capacity phase of operation;

prior to the commencement of the reduced-capacity phase of operation by at least the time interval, providing, by the first run-time environment, the first indication of the impending commencement of the reduced-capacity phase of operation of the first run-time environment;

obtaining, at the service request receiver, the first indication of the impending commencement of the reduced-capacity phase of operation of the first run-time environment; and directing, by the service request receiver, based at least in part on the first indication, a particular service request to the second instance of the application.

7. The method as recited in claim 6, further comprising performing, at the one or more computing devices:

collecting, at the first run-time environment, one or more resource consumption metrics; and estimating, at the first run-time environment using the one or more resource consumption metrics, a time of the commencement of the reduced-capacity phase of operation.

8. The method as recited in claim 6, further comprising performing, at the one or more computing devices:

setting aside, at the first run-time environment, a first set of resources to enable processing of in-flight service requests after the first run-time environment determines that the commencement of the reduced-capacity phase of operation is impending.

9. The method as recited in claim 6, further comprising performing, at the one or more computing devices:

obtaining, at the first run-time environment, an indication of the time interval by which the first indication of the impending commencement of the reduced-capacity phase of operation is to precede the commencement of the reduced-capacity phase of operation.

10. The method as recited in claim 9, wherein the indication of the time interval is obtained via one of: (a) a command-line argument used during the instantiation of the first run-time environment, (b) an invocation of an application programming interface subsequent to the instantiation of the first run-time environment, or (c) a message transmitted to the first run-time environment.

11. The method as recited in claim 6, wherein during the reduced-capacity phase of operation, the first run-time environment is configured to perform one or more of: (a) a garbage collection operation, (b) a data structure re-organization operation, or (c) a de-fragmentation operation.

12. The method as recited in claim 6, further comprising performing, at the one or more computing devices:

allocating a first set of resources to the first run-time environment based on a first set of parameters, wherein the first set of parameters includes a first maximum amount of heap memory; and allocating a second set of resources to the second run-time environment based on a second set of parameters, wherein the second set of parameters includes a second maximum amount of heap memory which differs from the first maximum amount of heap memory.

13. The method as recited in claim 6, further comprising performing, at the one or more computing devices:

decrypting, by the service request receiver to extract the particular service request, a collection of bytes received via a network, wherein the particular service request is transmitted to the second instance of the application in an un-encrypted format.

14. The method as recited in claim 6, further comprising performing, at the one or more computing devices:

instantiating, based at least in part on metrics associated with the first and second instances of the application, a third run-time environment to execute a third instance of the application; and directing, by the service request receiver, based at least in part on respective indications of reduced-capacity phases of operation at the first or second run-time environment, at least one service request to the third instance of the application.

15. The method as recited in claim 6, further comprising performing, at the one or more computing devices:

obtaining one or more performance metrics pertaining to service requests directed to the service request receiver, wherein the second run-time environment is instantiated in response to a determination that the one or more performance metrics do not satisfy a performance objective.

16. One or more non-transitory computer-accessible storage media storing program instructions that when executed on or across one or more processors cause one or more computer systems to:

instantiate a first run-time environment executing a first instance of an application, and a second run-time environment executing a second instance of the application;

schedule, by the first run-time environment, a first indication of an impending commencement of a reduced-capacity phase of operation of the first run-time environment based at least in part on a time interval by which the first indication is to precede the commencement of the reduced-capacity phase of operation;

prior to the commencement of the reduced-capacity phase of operation by at least the time interval, provide, by the first run-time environment, the first indication of the impending commencement of the reduced-capacity phase of operation of the first run-time environment;

obtain, at a service request receiver, the first indication of the impending commencement of the reduced-capacity phase of operation of the first run-time environment; and direct, by the service request receiver, based at least in part on the first indication, a particular service request to the second instance of the application.

17. The one or more non-transitory computer-accessible storage media as recited in claim 16, wherein the service request receiver is instantiated at a first host, and wherein the second run-time environment is instantiated at a second host.

18. The one or more non-transitory computer-accessible storage media as recited in claim 16, storing further program instructions that when executed on or across one or more processors further cause the one or more computer systems to:

obtain one or more performance metrics pertaining to service requests directed to the service request receiver; and terminate the second run-time environment in response to an analysis of the one or more performance metrics.

19. The one or more non-transitory computer-accessible storage media as recited in claim 16, storing further program instructions that when executed on or across one or more processors further cause the one or more computer systems to:
- obtain, at the service request receiver, the particular service request in an encrypted form from a load balancer of a network-accessible service; and
- decrypt, at the service request receiver, the particular service request.

20. The one or more non-transitory computer-accessible storage media as recited in claim 16, storing further program instructions that when executed on or across one or more processors further cause the one or more computer systems to:
- obtain, at the service request receiver, an indication that the reduced-capacity phase of operation has been completed at the first run-time environment; and
- direct, by the service request receiver to the first instance of the application, based at least in part on the indication that the reduced-capacity phase of operation has been completed, a subsequent service request.

\* \* \* \* \*